Aug. 9, 1932.    R. A. BAUDRY    1,870,830
THRUST BEARING
Filed May 11, 1928    2 Sheets-Sheet 1

INVENTOR
René A. Baudry,
ATTORNEY

Patented Aug. 9, 1932

1,870,830

UNITED STATES PATENT OFFICE

RENÉ A. BAUDRY, OF WILKINSBURG, PENNSYLVANIA, ASSIGNOR TO WESTINGHOUSE ELECTRIC & MFG. COMPANY, A CORPORATION OF PENNSYLVANIA

THRUST BEARING

Application filed May 11, 1928. Serial No. 277,052.

My invention relates to vertical thrust bearings, and more particularly to the structural arrangement of parts.

Heretofore, a great many of the parts utilized in thrust bearings have been of cast material which was disposed in the bearing uneconomically as well as inefficiently when the advantage of access for maintenance of parts is considered. For instance, as shown in the McCarty Patent No. 1,595,800, granted on August 10, 1926 to the Westinghouse Electric & Manufacturing Company, the segmental leveling shoes are supported by jackscrews which are retained by a ring of cast iron that is disposed for the purpose of bracing the jack-screws and preventing rotation thereof, yet bulky enough to carry the entire bearing load. This ring rests upon the bottom of an oil-pot which is also of cast iron having an upwardly extending cylindrical wall which cannot be removed when it is desired to remove one of the leveling shoes and thereby constitutes a hindrance.

My invention has been developed during a period of time when the trend in the construction of machinery has been to efficiently distribute the material by the utilization of sheet-iron plates and other structural parts.

In the development of my invention, I have utilized sheet-iron material and modern arc-welding methods to provide a thrust-bearing structure whereby the cost resulting from labor and material is greatly reduced. I provide also a leveling-shoe structure which has many novel features in itself which contribute to the efficiency and desirability of the construction as a whole.

Further, my invention has oil-baffling structures which are arranged to facilitate in the assembly or dis-assembly thereof, as for example, an outer cylindrical wall carries the oil-cooling coils and may be raised from the leveling-shoe base plate in order to provide access to the shoe.

It is an object of my invention to provide a simpler and cheaper construction of an oil thrust bearing.

It is another object of my invention to provide an oil-thrust bearing in which the leveling shoes are more accessible, as well as a bearing shoe that is free from extended portions that would, in any way, hinder its removal.

It is a further object of my invention to provide a structure whereby a great many machining operations required heretofore are eliminated.

Other objects and features of my invention will be brought out and better understood upon reading the following description and upon referring to the accompanying drawings in which, Figure 1 is an elevational view of an oil thrust bearing, showing in cross-section the structural arrangement of parts.

Figure 1:
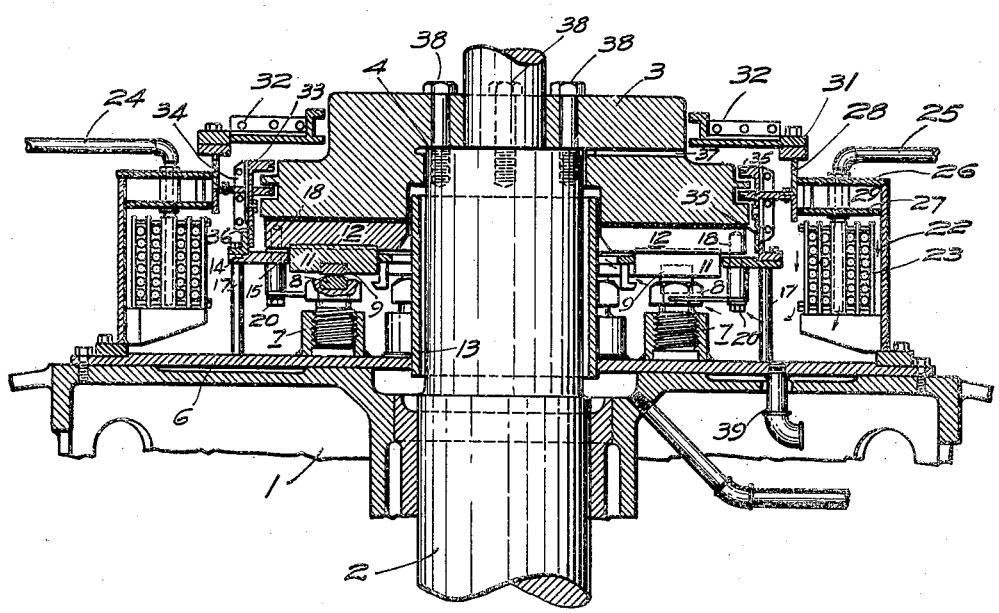

In Fig. 1, my thrust bearing is shown resting upon the bracket 1 of a vertical-type dynamo-electric machine having a vertical shaft 2. The upper end of the shaft 2 has a thrust collar 3 secured to the shoulder 4 and supported by a novel leveling shoe 5 of my invention. The leveling shoe 5 comprises an annular base plate 6 which supports a plurality of screw-jacks 7 that are disposed at equal circumferential distances on the top of the plate. The head of each jack screw receives a cylinder 8 of hard tool steel on which is disposed another cylinder 9 of the same material. The latter cylinder 9 engages the bottom of disc 11 that further engages a recess in the underside of the segmental bearing shoe 12. A sleeve 13 has one of its ends secured to the inner periphery of the annular base plate and projects upwardly therefrom.

Figure 2:
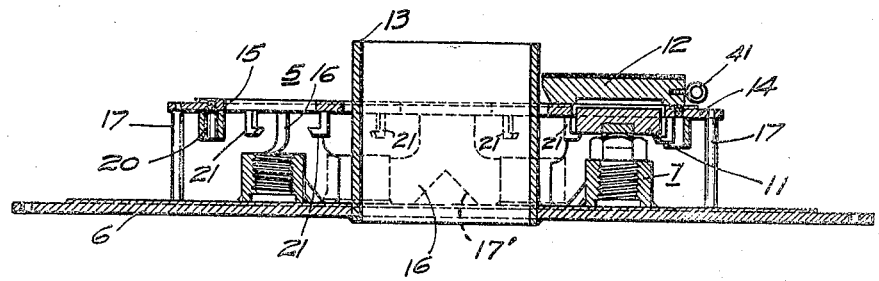
Fig. 2 is a sectional view, in elevation, of the novel leveling shoe, taken on the line II—II of Fig. 3, and showing one segmental leveling shoe in its lower position.

In order to prevent rotation of the leveling shoes, an upper annular plate 14, having holes 15 in which are slidably mounted the discs 11, is supported above the base plate 6 by plates or supports 16 and the rod supports 17. The plates or supports 16 are designed and disposed to provide against the entire shearing stress due to the tendency for the shoes to rotate, and, for this reason, they are disposed in the intervals between the jack-screws 7 and are braced thereby. It was found that, during the welding operation of the vertical supports 16 to the bottom of the upper plate 14, there was a tendency for the outer periphery of the plate to buckle and, for this reason, the rod supports 17 were utilized. The plates 16, as shown in Fig. 2, are each provided with a central, oil-passage notch 17' therein.

In the construction of the leveling shoe utilized heretofore, and more particularly in the above mentioned patent, the leveling shoe was provided with a downwardly projecting tenon upon which considerable machining was necessary in order that the part could be slid into a recess obtained in a cash-iron ring heretofore utilized and unnecessary with my invention. With my invention, I eliminate the projecting tenon and, consequently, eliminate the cost of machining.

Figure 3:
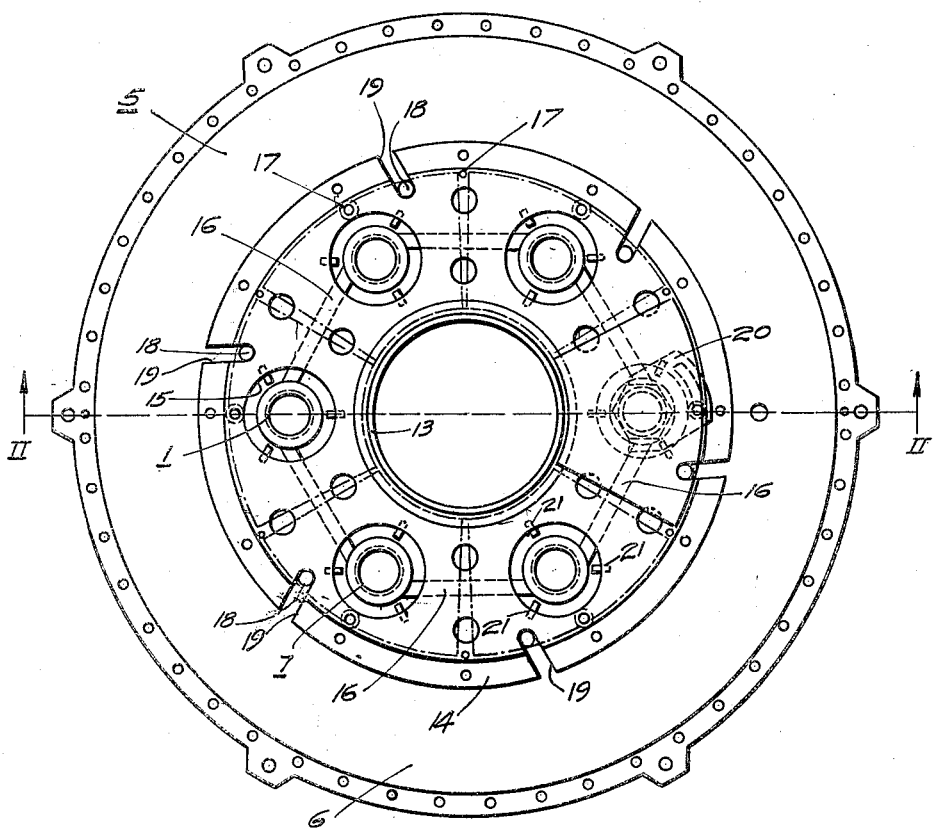
Fig. 3 is a top plan view of the leveling shoe shown in Fig. 2.

The bearing shoes 12 are prevented from turning on their underlying discs 11 by downwardly projecting dowel pins 18 which cooperate with slots 19 (shown in Fig. 3), in the outer periphery of the upper plate 14. A locking device 20, projecting downwardly from the bottom of the upper plate 14 (plan view of which is shown in Fig. 3) and cooperating with the head of the jack-screw 7, maintains the leveling shoe in its final adjusted position.

Upon lowering the jack-screw 7, the disc 11 slips out of recess engagement with the bearing shoe 12 and may, if desired, be supported by a plurality of downwardly extending hooks 21. At any rate, the disc 11, when lowered, leaves the bearing-shoe resting on the top of the upper plate 14 where it is free for removal by sliding it over the said upper plate.

The entire bearing is surrounded by an exterior cylindrical wall 22, having a bottom bossed portion which is tightly bolted down to the base plate 6 of the leveling-shoe. This wall and the sleeve 13 provide a chamber for oil in which the bearing parts are immersed. The outer wall 22 carries a cooling coil 23 that is removable therewith and has inlet pipe 24 and an outlet pipe 25, both of which pass through two spaced horizontal plates 26 and 27. The upper plate 26 provides a seal for the oil chamber, while the lower plate 27, the outer periphery of which is secured to the wall and the inner periphery of which is spaced from a vertically extending cylindrical wall 28 carried by the inner periphery of the upper horizontal extending plate, provides a dead air chamber in which the oil may rise, the advantages of which are that the contact of the oil with the air, while in its turbulent state, is decreased. The upwardly extending wall 28 carries a horizontal plate 31 which is preferably made in two sections having abutting portions 32.

The inner periphery of the upper plate 26 supports a spaced vertically-projecting baffle wall 33 which is made of two sections having abutting portions 34 and which is provided with inwardly projecting sealing rings for cooperation with corresponding sealing grooves in the periphery of the thrust collar 3. This baffle wall is provided to reduce turbulence and consequent admixture of air with the oil, as explained in the above mentioned patent. Holes 35 are provided in the baffle at a height opposite the edges of bearing surface, to allow some of the oil to pass upon being centrifugally thrown. Any oil that creeps upwardly on the outer surface of the thrust collar is further restricted by an inwardly projecting ring having holes through which excess oil may pass.

The circulating path of the oil is indicated by the arrows. The oil is thrown outwardly from the edge of the bearing surface because of centrifugal force and passes through the holes in the baffle plate to the cooling coils where it is cooled, thence downwardly in the outer portion of the chamber and up past the bearing shoes to the inner end of the bearing surfaces.

A hole 37 is provided in the thrust collar to provide atmospheric pressure at the inner edge of the bearing surface in order to prevent any creepage of oil upwardly over the end of the sleeve and down the surface of the shaft. However, any oil which does escape is collected in the chamber provided in the bracket of the machine and is drained through a pipe extending therefrom.

The thrust collar 3 is designed much differently than collars used heretofore in large bearings wherein the axial thrust on the collar was maintained by a large nut threaded to the shaft above the thrust collar. This nut would seal itself to the shaft and become difficult to remove. Also the nut was of heavy construction and added much to the expense of the thrust bearing. Consequently, the cost of the bearing has been reduced by using the type of thrust collar that is illustrated, where the thrust is carried by a plurality of bolts 38 secured to the shoulder 4 of the shaft.

In dis-assembling for removal of a leveling-shoe, after the oil within the oil chamber is drained through a pipe 39, introduced in the bottom of the base plate, the upper horizontally extending plate 31 is removed, and the outer cylindrical wall 22, carrying the cooling coil 23, is detached from the base plate and raised upwardly. The baffle plate 33 is disconnected and removed. The jack-screws are unlocked and lowered, allowing the bearing-shoes 12 to rest upon the plate (as shown in Fig. 2) and immediately out of engagement with the mounting mechanism. For removing the leveling-shoe in a horizontal direction, a hole is provided in the leveling-shoe for insertion of an eye bolt 41.

Thus, I have shown a thrust bearing whereby the removal of a leveling-shoe is greatly facilitated in that the outer cylindrical wall can be removed, allowing the shoe to be extracted much more easily than in other constructions.

Further, by my invention, I have provided a thrust bearing wherein the material has been properly distributed with the view of saving in cost, as well as a thrust bearing which is separate from the machine. I desire that only such limitations shall be made as are specified in the appended claims.

I claim as my invention:

1. In a leveling shoe for a vertical thrust bearing, a ring-shaped base plate, a plurality of jack-screws secured to said plate, discs supported by said screws, segmental bearing shoes supported on said discs, said discs being in recess engagement with the bottoms of said bearing shoes, means for preventing rotation of said shoes, comprising an upper, annular-shaped plate spaced above said base plate and having holes therein, said discs being slidably mounted in said holes, means for preventing rotation of each of said shoes relative to each of said discs comprising a dowel pin extending downwardly from the bottom of said shoes into a slot disposed in the outer periphery of said upper plate, and each of said shoes having a threaded hole adapted to receive a screw eye for removal of said shoe.

2. A vertical-shaft thrust bearing characterized by an oil reservoir having a base member, a plurality of separate upstanding internally threaded thin-walled bosses, means for separately securing each of said bosses to said base member, screws in said bosses, a disc tiltably supported on the top of each screw, a separate top portion which is perforated to support said discs with freedom to slide vertically, separate structural-metal pieces for supporting said top portion from said base member, said pieces being so shaped and disposed as to provide for easy oil circulation, and a segmental bearing shoe interlockingly seated on the top of each of said discs and of a size larger than said perforations, the construction being such that, when the screws are screwed down, the shoes rest on top of said perforated portion out of interlocking engagement with the discs and can be removed by sliding outwardly over the surface of said perforated portion.

3. In a fabricated leveling shoe for a vertical thrust bearing, a base ring having an upstanding sleeve secured to the inner periphery thereof, an upper guide ring supported by said base ring and having a plurality of holes therein, the supports between said upper guide ring and said base ring including a plurality of plates with central, oil-passage notches therein, a plurality of upstanding internally threaded pipes separately welded to said base ring and spaced therearound in substantially axial alignment with the holes of said guide ring, said pipes being braced by said plates, a jack-screw in each of said upstanding internally threaded pipes, a plurality of discs slidably supported in said holes by said jack-screws, and a plurality of bearing shoes supported by said discs.

4. In a fabricated leveling shoe for a vertical thrust bearing, a base ring having an upstanding sleeve secured to the inner periphery thereof, an upper guide ring supported by said base ring and having a plurality of holes therein, a plurality of upstanding internally threaded pipes separately welded to said base ring and spaced therearound in substantially axial alignment with the holes of said guide ring, a jack-screw in each of said upstanding internally threaded pipes, a plurality of discs slidably supported in said holes by said jack-screws, and a plurality of bearing shoes supported by said discs, the supports between said upper guide ring and said base ring being open work so as to provide for easy oil circulation under said upper guide ring and into the inner edges of said bearing shoes.

In testimony whereof, I have hereunto subscribed my name this first day of May, 1928.

RENÉ A. BAUDRY.